United States Patent

Marcatili et al.

[11] 4,019,805
[45] Apr. 26, 1977

[54] OPTIMIZED PARABOLIC-INDEX OPTICAL FIBER COMMUNICATION SYSTEM WITH INCOHERENT LIGHT SOURCE

[75] Inventors: Enrique Alfredo Jose Marcatili, Rumson; Dietrich Marcuse, Lincroft, both of N.J.

[73] Assignee: Bell Telephone Laboratories, Incorporated, Murray Hill, N.J.

[22] Filed: July 25, 1975

[21] Appl. No.: 599,082

[52] U.S. Cl. .................... 350/96 C; 350/96 GN; 350/96 WG
[51] Int. Cl.² .................................... G02B 5/14
[58] Field of Search ...... 350/96 GN, 96 WG, 96 C; 250/227, 551–553

[56] References Cited
UNITED STATES PATENTS

| | | | |
|---|---|---|---|
| 3,832,028 | 8/1974 | Kapron | 350/96 WG |
| 3,904,268 | 9/1975 | Keck et al. | 350/96 WG |

OTHER PUBLICATIONS
Cook, Article in *Scientific American* Nov. 1973, pp. 28-35 cited.
Yang et al., Article in *Applied Optics* Feb. 1975, pp. 288-293 cited.

*Primary Examiner*—David H. Rubin
*Attorney, Agent, or Firm*—Wilford L. Wisner; Daniel D. Dubosky

[57] ABSTRACT

The disclosed optical fiber communication system employs a fiber with a core having an index of refraction graded in an approximately parabolic fashion and a light-emitting diode joined directly to the fiber to serve as the light source for the system. It has been found that the overall electrical efficiency of the system, at least with respect to drive power for the diode, is maximized when the ratio of the diode radius to the radius of the fiber core is about 0.2. More broadly, the ratio of radii is found advantageously to lie in the range between about 0.1 and about 0.8, not only for efficiency reasons but also to maximize the amount of light injected into the fiber.

2 Claims, 9 Drawing Figures

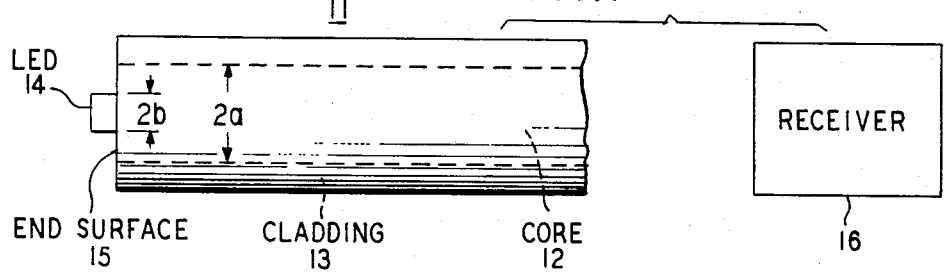
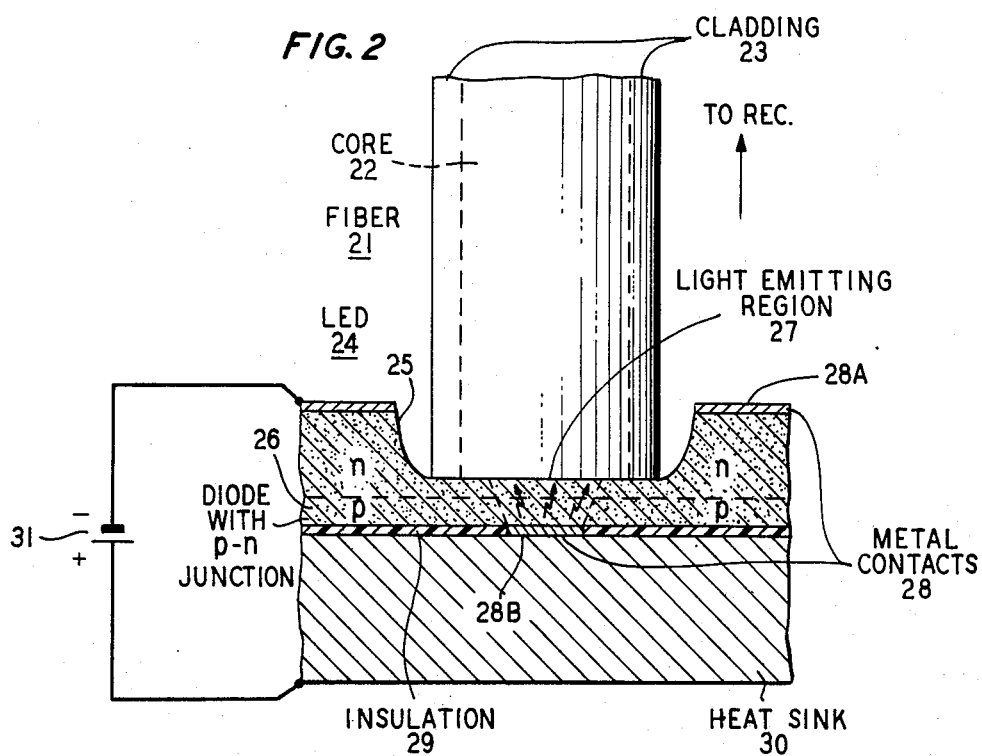
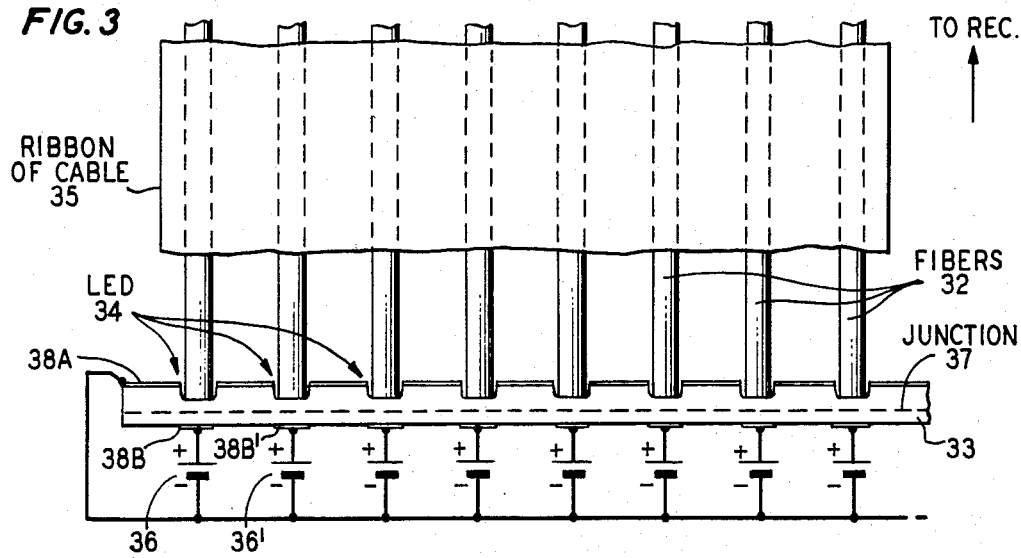

OPTIMIZED PARABOLIC-INDEX OPTICAL FIBER COMMUNICATION SYSTEM WITH INCOHERENT LIGHT SOURCE

BACKGROUND OF THE INVENTION

This invention relates to optical fiber communication systems of the type using incoherent light sources, such as light-emitting diodes, commonly called LEDs.

Such diodes may be directly modulated and have been found attractive for early versions of optical communication systems, particularly those using multimode fibers. The most attractive multimode fiber for use in such systems presently appears to be the parabolic-index-profile fiber, that is, a fiber in which the core is graded in index of refraction from a maximum index on its central axis parabolically down to a minimum index adjacent to the cladding.

There have been a number of studies of ways of obtaining effective systems using LEDs. In general, in the prior art, it is assumed that the radius of an LED shoud be approximately equal to the radius of the core of the fiber, whether it be a step-index-profile fiber or a graded-index-profile fiber. For example, see the copending patent application of E. A. J. Marcatili, Ser. No. 571,103, filed April 24, 1975, and assigned to the assignee hereof. Moreover, when other relationships have been investigated as to diode size, it has been assumed that, when the diode radius is smaller than the fiber core radius, additional optics will inevitably be required. An example of such an article is that by K. H. Yang et al, *Applied Optics*, Volume 14, page 288 (February 1975).

Nevertheless, that conclusion may be incorrect; and, in any event, it is highly undesirable for an economical commercial system to be required to use such additional optics, which will tend to be relatively expensive compared to the rest of the system.

The nature of the relationships which may be obtained with a parabolic-index fiber when such additional optics are lacking has not been sufficiently investigated. Substantial advantage may be realized by pursuing these questions to their ultimate conclusion.

In particular, it is an object of the present invention to obtain a more effective and more efficient optical fiber communication system utilizing incoherent light. It is also desired to have the diode and a parabolic-index fiber directly bonded together.

SUMMARY OF THE INVENTION

The invention is based on the discovery that an optical fiber communication system employing a parabolic-index fiber can be optimized with respect to overall electrical efficiency of driving the diode and, alternatively with respect to the maximum light injection into the fiber, by providing that the ratio of the radius of the LED to the radius of the core of the fiber lie in the range between about 0.1 and 0.8.

According to a specific feature of the invention, the optimum electrical efficiency is obtained for a ratio of about 0.2.

BRIEF DESCRIPTION OF THE DRAWING

Further features and advantages of my invention will become apparent from the following detailed description, taken together with the drawing, in which:

FIG. 1 is a partially pictorial and partially block diagrammatic illustration of a first embodiment of the invention;

FIG. 2 is a more detailed partially pictorial and partially schematic illustration of the LED and its juncture with the fiber;

FIG. 3 is a partially pictorial and partially schematic illustration of a ribbon-type optical fiber cable employing the invention.

DESCRIPTION OF ILLUSTRATIVE EMBODIMENT

Figure 5:
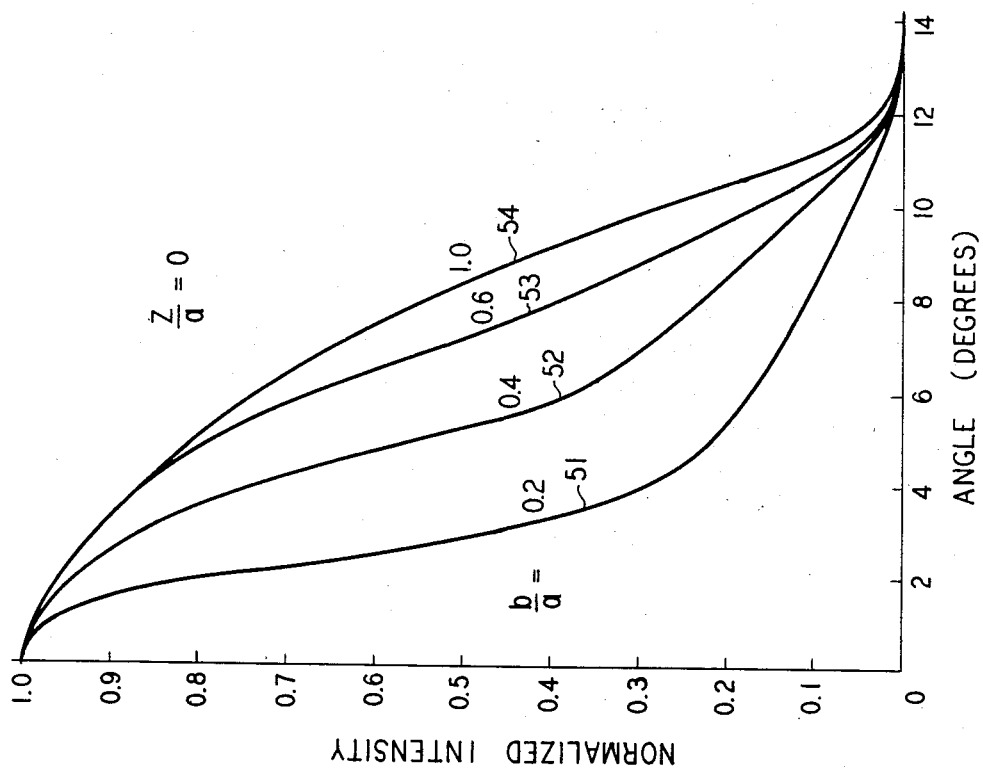
FIGS. 4 through 9 show curves which are useful in explaining the theory and operation of the invention.

In the system of FIG. 1 it is desired to transmit information on a light beam emitted by a light-emitting diode 14 through a parabolic-index-profile fiber 11 to a receiver 16. The diode is typically modulated by control of its current (by means not shown). Especially in a system in which many such fibers and LEDs may be compacted into a small space, it is important to avoid excessive heat dissipation by utilizing the LEDs efficiently and to provide good signal-to-noise ratio at each receiver by insuring that sufficient multimode light is injected into the fiber 11.

In more detail, the fiber 11 includes a core region 12 in which the index of refraction varies from a maximum value on its central axis to a minimum value at its interface with the cladding 13. This variation desirably will approximate a parabolic variation from the axis to the cladding as a function of radius, as this will provide good continuous focusing action and will tend to minimize intermode pulse delay in the multimode fiber 11.

Intermode pulse delay is the difference in propagation delay in the fiber between components of a pulse carried by different modes that travel with slightly different velocities.

By multimode, it is meant that the diameter $2a$ of the core is sufficiently larger than the wavelength $\lambda$ of the light emitted by the LED 14, so that the fiber 11 will support more than the fundamental transverse mode of optical radiation, and that, with an LED light source, light will actually propagate in the fiber in more than one transverse mode. Indeed, such a property is necessary with an incoherent light source such as LED 14, since its emission can be coupled efficiently only into a multimode fiber. Illustratively, the diameter $2a$ is 100 micrometers, the axial index, $N_o$, is illustratively 1.437; and the index, $N_{rc}$, adjacent to cladding 13 is 1.423, achieved by fabricating the fiber with a variable proportion of germania ($GeO_2$) to silica ($SiO_2$) as a function of the radial position from the axis to the cladding. Illustratively, the cladding 13 is a pure silica glass of still lower index than any portion of the core 12. It is also common practice that the core 12 will include some small portion of other materials such as boron oxide ($BO_2$).

In FIG. 1, LED 14 is shown as presenting a smaller diameter, $2b$, to the core 12 than the diameter, $2a$, of the latter.

In practice, this effect is achieved as shown in FIG. 2. The diode 24 actually includes a function between $p$ and $n$ regions 26 and 25 respectively, metallic contacts 28A and 28B to the $n$ and $p$ regions respectively and a heat sink 30, the heat sink being separated from $p$ region 26 by an electrical insulating layer 29 to either side of the contact 28B, illustratively beryllia, which is a good heat conductor. The effective diameter and radius of the diode 24 is determined by the lateral extent of the contact 28B, and specifically by its projection on the end of the core 22 of the fiber. It is this diameter which determines the light-emitting region 27 as current flows between contacts 28B and 28A.

The diode 24 is forward biased by a battery 31 havings its positive terminal connected toward the p region 26, illustratively connected to contact 28B through heat sink 30, which is copper, and having its negative terminal connected directly to contact 28A, which is an annulus of metallic alloy. Contacts 28A and 28B are typically gold.

In practice, the actual demonstration that such a relatively small diode radius will result in increased efficiency of the system is based on a theoretical analysis, which, in turn, is based on wave optics.

While the detailed mathematical terminology will not be set out or explained here, it should be sufficient to state that Laguerre-Gaussian modes were used to approximate the modes of the parabolic-index fiber 11 or 21.

The optimization problem was stuided not only with respect to the source radius but also with respect to its distance from the fiber and its transverse displacement from the fiber axis. Various aspects of this analysis allow us to conclude that the LED joined directly to the fiber is not only a viable system but, indeed, is substantially advantageous in many respects.

Because the modes of the parabolic-index fiber join smoothly with the Laguerre-Gaussian beam modes of free space, the excitation of the fiber modes can be determined from the latter. Execution of the mathematics yields the result that the power injected into the fiber, p, exhibits the following characteristics. First of all, each mode receives an equal amount of power if the incoherent source is large enough. Secondly, each mode acts as though it receives radiation from an area of the source surface whose sides are equal to the wavelength and as if it collects all the power radiated into the solid angle one-half steradians. The power that is collected by all the guided modes of the fiber is determined by considering the number of modes actually existing which are no cut off.

The analysis shows that modes with equal values of the compound mode number $$M = 2p + \nu + 1 \tag{1}$$

have equal propagation constants. If the source is placed directly in contact with the fiber, the modes excited will be almost equally excited for a given value of M.

Figure 4:
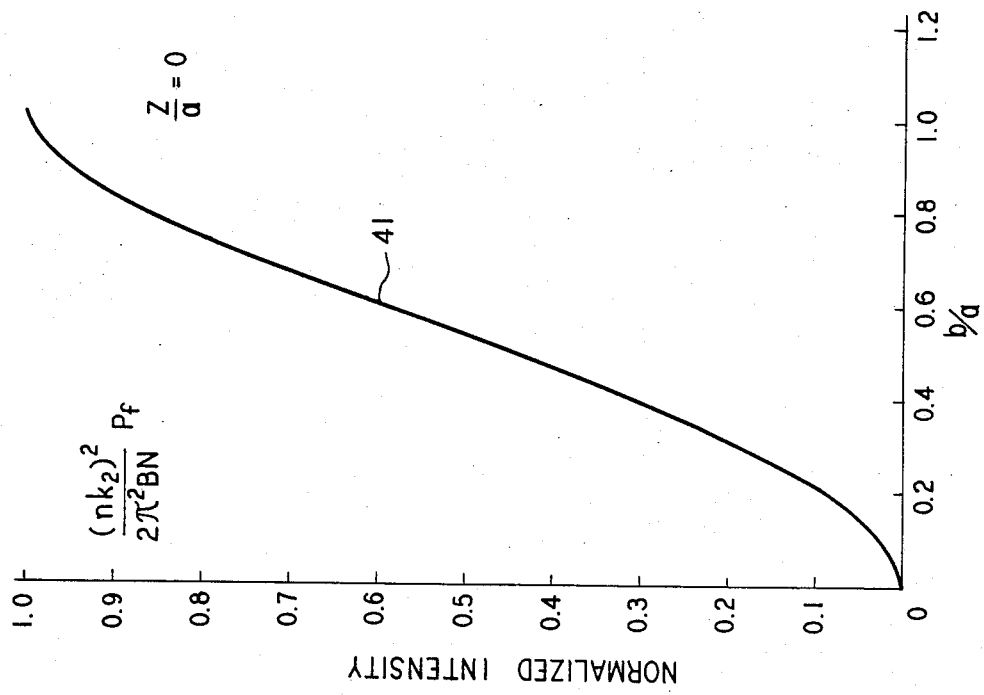

In FIG. 4, curve 41 shows the normalized total amount of injected power for $z/a = 0$, that is, the separation from the fiber end equals 0, as a function of the relative source radius $b/a$, assuming that diode brightness, B, is not a function of $b/a$. As expected, the total amount of injected power drops off as $b/a$ decreases below about 1.0. Nevertheless, the decrease in total power is not proportional to the area of the source as one might have expected but is nearly proportional to the source radius. This behavior has interesting consequences for a realistic optimum choice of the ratio of source radius $b$ to the fiber core radius $a$, as will now be discussed.

FIG. 5 shows the far field radiation patterns from the far end of the fibers for several values of $b/a$, the latter being the parameter which defines the family of curves 51, 52, 53 and 54. The horizontal axis is the angle of the escaping radiation defined in relation to the fiber axis, and the vertical axis is radiation intensity normalized to its peak value in the pattern. Higher order modes are excited less strongly as the source radius decreases so that more of the intensity is near the central part of the pattern.

If the source brightness B is held constant, more power is injected in the fiber as $b/a$ increases to a value of about 1.0 and, indeed, does not vary significantly from unity for still higher values. Beyond unity, no significant advantage is to be gained. In fact, even though the total amount of the injected power remains constant for $b/a > 1$, the overall efficiency decreases, since regions of the source at $b > a$ do not contribute to the excitation of the fiber, but waste their power.

In summary to this point of the analysis, if brightness were independent of the dimensions of the source, the optimum source radius would be $b = a$.

Nevertheless, light-emitting diodes tend to be brighter as their radii decrease. See the article by C. A. Burrus, "Radiance of Small-Area High-Current-Density Electroluminescent Diodes", *Proceedings of the IEEE*, Volume 60, No. 2, pages 231-232 (Feb. 1972). This dependence is shown by curve 61 in FIG. 6, with B on the vertical axis and $b/a$ on the horizontal axis. The deviation between the two curves 61 and 62 indicates the deviation from a hyperbola, dashed curve 62, $$B = 950/2b \tag{2}$$

which can approximate the data within its experimental uncertainty.

Figure 7:
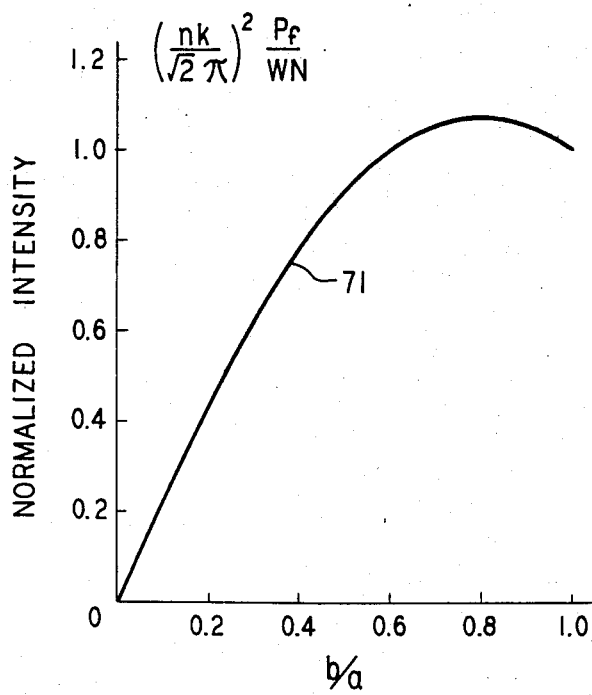

Reference is now made to FIG. 7. Under the conditions prevailing in Burrus type diodes, where the maximum attainable brightness depends on the source radius, the total power that can be injected by an LED in direct contact with a parabolic-index fiber has a maximum at a source radius of $b = 0.8a$.

Figure 6:
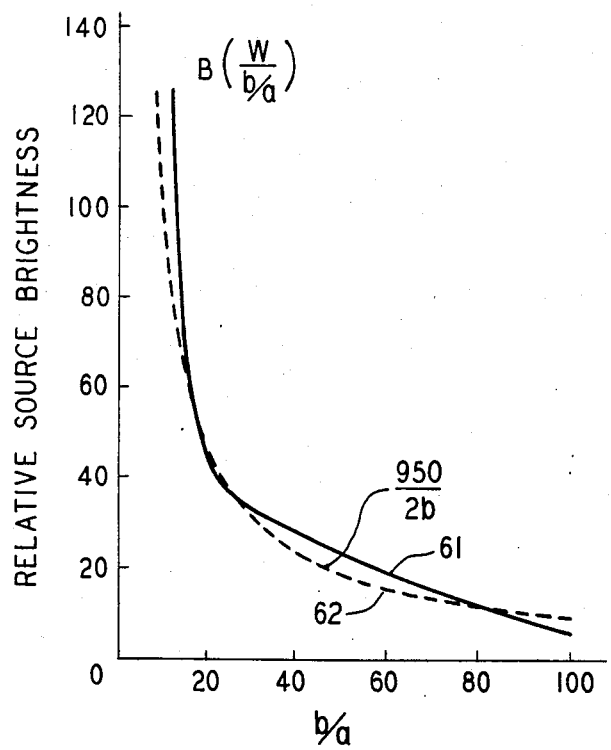

In FIG. 7, curve 71 is the relevant modification of curve 41 provided the source brightness is not constant but varies according to FIG. 6. Curve 71 is flat enough that an LED with a radius only approximately half as large as that of the fiber core is still almost as effective as an LED whose radius equals the fiber core radius.

Disregarding the electrical input power into the LED, we would optimize the overall performance of the fiber system, operated without a matching lens, by choosing a source to fiber radius ratio of $b/a = 0.8$. The injected light power would be maximized.

Figure 8:
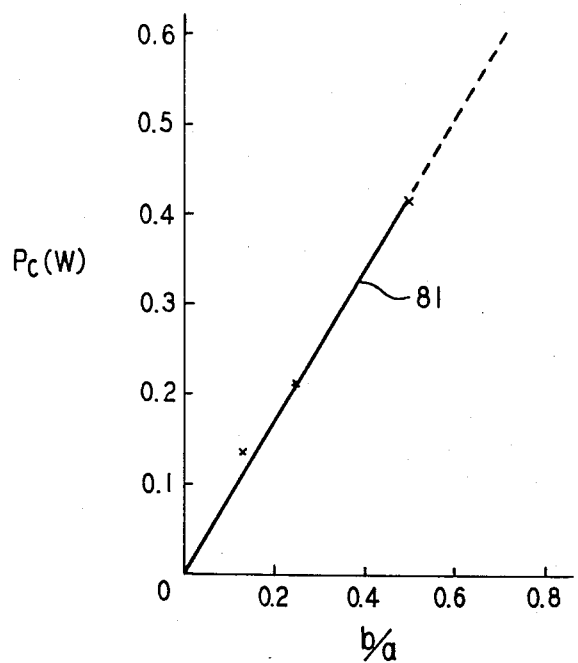
Figure 9:
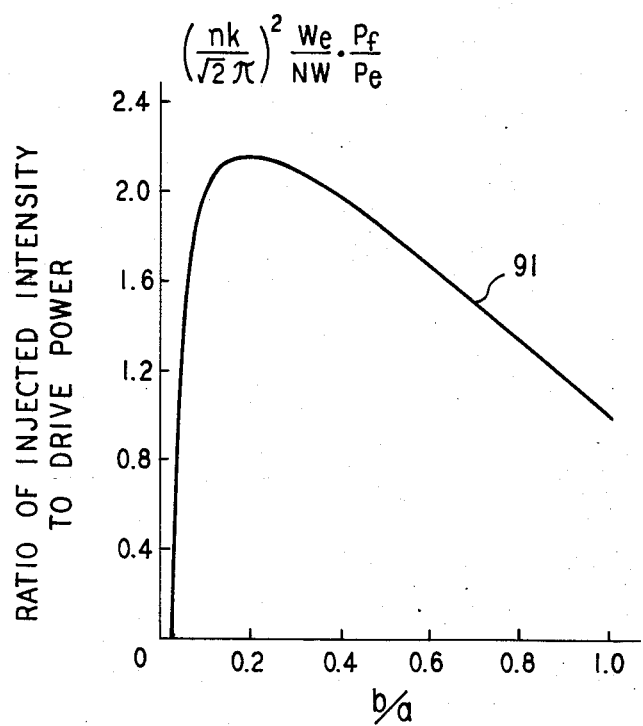

However, a different optimum is obtained if we try to optimize the overall electrical efficiency of light power injection into the fiber, and determine $b/a$ to yield that condition. The power input to the LED can be estimated from the information contained in Burrus's paper by multiplying the diode current with the energy gap voltage $V = 1.38$ V (at room temperature). This power estimate comes close to the actual power since the voltage developed across the LED's terminals varies between 1.35 and 1.6 volts. Four points obtained for the LED's power consumption operated at 2/3 the saturation current are shown in FIG. 8 as a function of the radius $b/a$. In the region shown the power curve is approximately linear. According to the limited information that is available the curve seems to turn over for larger values of $b/a$. However, since only one known point does not lie on the straight line, the shape of the curve beyond that shown is not known. For sufficiently small source radii we approximate the curve in FIG. 8 by the equation $$P_3 = 8.5 \cdot 10^{-1}(2b) = W_e b/a \qquad (3)$$

keeping in mind that this linear law becomes questionable for larger $b/a$. Combining equation (3) with the analytical expression for curve 41 of FIG. 4 yields the relationship shown in curve 91 of FIG. 9.

The maximum of the fiber excitation efficiency, which means, for a given injected light power, a minimum electrical drive power of the diode, appears at $b/a = 0.2$, a surprisingly small source radius.

A good compromise between the maximum achievable total injected light power and the desire to obtain good excitation efficiency relative to the power input to the LED may be to operate with a diode whose radius is approximately one-half of the fiber radius. In this case, $b/a = 0.5$, we lose 12 percent of the optimum overall power efficiency and work 14 percent below the maximum achievable injected power. But neither loss of efficiency is very serious and both requirements, low diode power consumption as well as a large amount of total power launched into the fiber, are still approximately satisfied.

The invention is clearly applicable to the excitation of parabolic-index fibers in an optical fiber cable. In FIG. 3, a ribbon-type configuration is shown. Various fibers 32 are included in the cable 35, illustratively with equal spacing. Advantageously, a plurality of LEDs 34 may be formed by the use of a common substrate 33 and a common p–n junction 37. Each diode is distinguished from its neighbors by the laterally limited extent of its lower electrode 38B etc., each connected to the positive terminal of its individual battery 36.

Clearly, a common heat sink (not shown) may be used for all the diodes and would separate the electrodes 28B etc. from the respective portions of the substrate.

The cable 35 would extend to a receiver just as shown in FIG. 1.

The significance of the embodiment of FIG. 3 resides in the fact that it illustrates the type of situation in which it is desirable to avoid excessive heat build-up and in which, therefore, it is desirable to achieve maximum electrical efficiency in driving the LEDs.

What is claimed is:

1. An optical fiber communication system of the type employing an incoherent light-emitting source having a light-emitting region concentrically mounted directly on the end of an approximately parabolic-index profile optical fiber having a core surrounded by a cladding material, characterized in that the ratio of the radius of the light-emitting region of said source to the radius of the parabolic-index profile core of the optical fiber is approximately 0.2.

2. An optical fiber communication system of the type employing a plurality of optical fibers each one of which has an approximately parabolic-index profile core surrounded by a cladding material, said plurality of fibers being bound in a common optical fiber cable, a plurality of light-emitting diodes mounted on a common substrate each one of which has a light-emitting region concentrically mounted directly on the end of one of said plurality of optical fibers, characterized in that each one of the diodes has a ratio of light-emitting region radius to the radius of the respective core of the fiber to which it is coupled equal to about 0.2.

* * * * *